United States Patent
Scharf

(10) Patent No.: US 10,550,461 B2
(45) Date of Patent: Feb. 4, 2020

(54) INTERNAL COMBUSTION ENGINE AND METHOD FOR PRODUCING A CRANKCASE AND/OR A CYLINDER LINER FOR AN INTERNAL COMBUSTION ENGINE

(71) Applicant: MAN Truck & Bus AG, München (DE)

(72) Inventor: Peter Scharf, Nürnberg (DE)

(73) Assignee: MAN TRUCK & BUS AG, München (DE)

( * ) Notice: Subject to any disclaimer, the term of this patent is extended or adjusted under 35 U.S.C. 154(b) by 0 days.

(21) Appl. No.: 15/910,880

(22) Filed: Mar. 2, 2018

(65) Prior Publication Data

US 2018/0251880 A1    Sep. 6, 2018

(30) Foreign Application Priority Data

Mar. 4, 2017   (DE) ........................ 10 2017 002 078

(51) Int. Cl.
| | | |
|---|---|---|
| *C23C 4/08* | (2016.01) | |
| *F02F 1/00* | (2006.01) | |
| *C23C 4/131* | (2016.01) | |
| *C23C 4/134* | (2016.01) | |
| *F02F 7/00* | (2006.01) | |

(52) U.S. Cl.
CPC .............. *C23C 4/08* (2013.01); *C23C 4/131* (2016.01); *C23C 4/134* (2016.01); *F02F 1/004* (2013.01); *F02F 7/0085* (2013.01)

(58) Field of Classification Search
CPC ........... C23C 4/08; C23C 4/131; C23C 4/134; C23C 4/18; F02F 1/004
See application file for complete search history.

(56) References Cited

U.S. PATENT DOCUMENTS

| | | | |
|---|---|---|---|
| 4,822,415 A | | 4/1989 | Dorfman et al. |
| 2003/0164150 A1* | | 9/2003 | Barbezat .................. C23C 4/16 123/193.2 |
| 2012/0090462 A1 | | 4/2012 | Pelsoeczy |
| 2013/0061885 A1* | | 3/2013 | Treutmann .............. B08B 3/024 134/34 |

(Continued)

FOREIGN PATENT DOCUMENTS

| | | |
|---|---|---|
| DE | 202008009966 U1 | 11/2008 |
| DE | 102012009496 A1 | 11/2013 |

(Continued)

OTHER PUBLICATIONS

PMPA (Dimensional Contraction of 17-4 PH Stainless Steel. (Feb. 28, 2012). Retrieved from https://pmpaspeakingofprecision.com/tag/din-1-4548/).*

*Primary Examiner* — Kevin A Lathers
(74) *Attorney, Agent, or Firm* — Weber Rosselli & Cannon LLP

(57) ABSTRACT

The present disclosure relates to an internal combustion engine, in particular a reciprocating internal combustion engine, having at least one cylinder, wherein a cylinder wall of the cylinder is formed at least at a wall region forming a cylinder barrel by a coating of a crankcase or of a cylinder liner of the internal combustion engine by means of a coating material. According to the present disclosure, the coating material is formed of a high-alloy, steel alloy including, as alloying elements, chromium, nickel, copper and niobium.

5 Claims, 3 Drawing Sheets

(56) References Cited

U.S. PATENT DOCUMENTS

2015/0218687 A1    8/2015  Goedel et al.
2016/0130691 A1*  5/2016  Wang ...................... C23C 4/127
                                                       427/446

FOREIGN PATENT DOCUMENTS

| DE | 102014211366 A1 | 12/2014 |
|----|-----------------|---------|
| DE | 102014217040 A1 | 3/2016  |
| DE | 102015207833 A1 | 11/2016 |
| EP | 2664684 A2      | 11/2013 |

\* cited by examiner

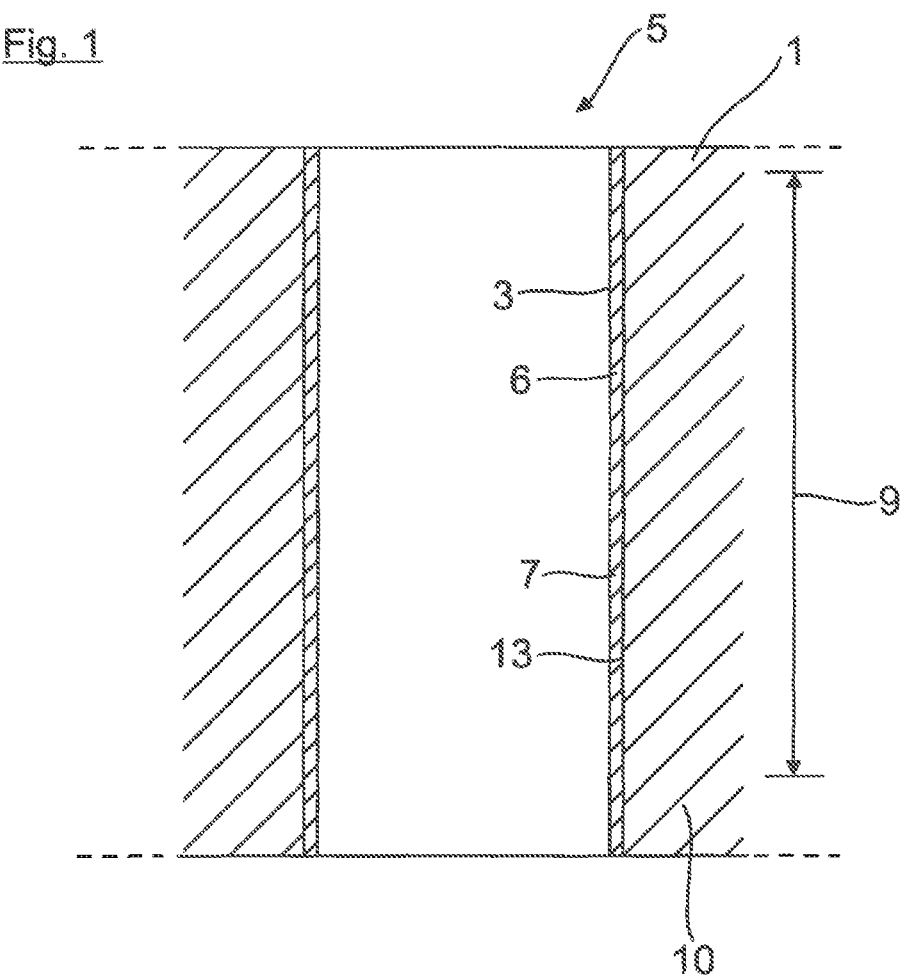

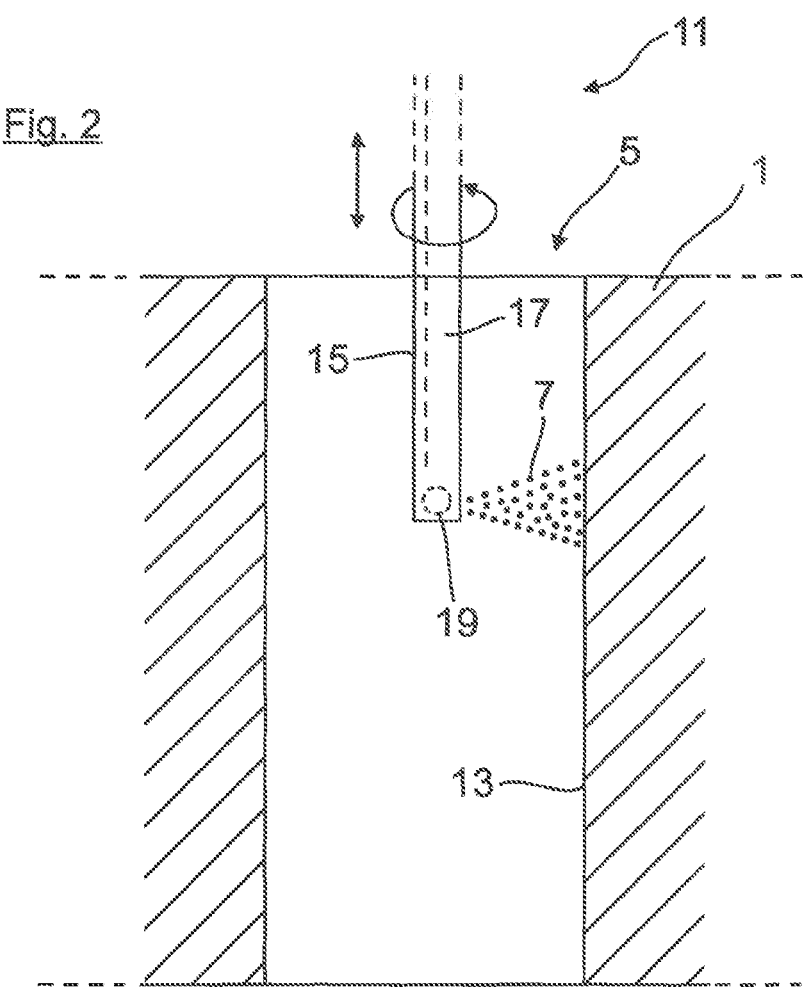

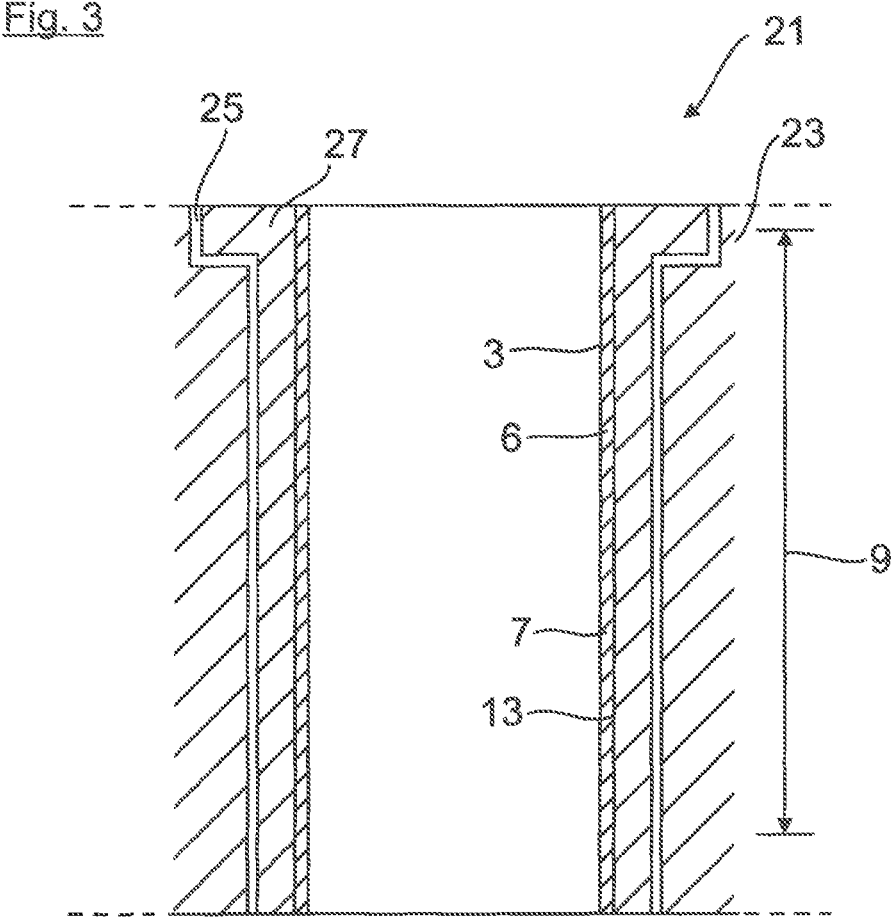

INTERNAL COMBUSTION ENGINE AND METHOD FOR PRODUCING A CRANKCASE AND/OR A CYLINDER LINER FOR AN INTERNAL COMBUSTION ENGINE

BACKGROUND

The present disclosure relates to an internal combustion engine, in particular a reciprocating internal combustion engine, and to a method for producing a crankcase or a cylinder liner for an internal combustion engine.

A significant aim in the development of internal combustion engines is to design the cylinder barrels of the engines so that they are resistant to wear and corrosion-resistant to the greatest possible extent. A high wear resistance of the cylinder barrels is important here in order to be able to ensure a high service life of the internal combustion engine. A high corrosion resistance of the cylinder barrels is necessary, for example, because there are still what are known as poor-quality fuel countries in which primarily only fuels with a relatively high sulfur content are available. The combustion of such a fuel gives rise to sulfuric acid condensates, and these can lead to what is termed corrosive wear of the cylinder barrels. Furthermore, corrosive condensates are formed to an increased extent even in the case of internal combustion engines with exhaust-gas recirculation.

DE 10 2015 207 833 A1 discloses a cylinder crankcase for an internal combustion engine in which at least one cylinder barrel is formed from a material comprising chromium, molybdenum, carbon and ceramic. The chromium and ceramic content in the coating of the cylinder barrel is intended to counteract corrosive attack by the acid, in particular sulfuric acid, which may arise in the cylinder during the fuel combustion.

When using a coating material which comprises ceramic particles for the coating of a cylinder barrel, it is disadvantageous, however, that honing of the cylinder barrel which follows the coating is made significantly more difficult on account of the abrasively acting ceramic particles.

SUMMARY

It is therefore an object of the present disclosure to provide an internal combustion engine, in particular a reciprocating internal combustion engine, and also a method for producing a crankcase or a cylinder liner for an internal combustion engine, in which the at least one cylinder barrel has been or is coated with a coating material which is particularly wear-resistant, corrosion-resistant and at the same time can also be easily machined or honed and also is cost-effective.

One aspect of the present disclosure is directed to an internal combustion engine, in particular a reciprocating internal combustion engine, having at least one cylinder, wherein a cylinder wall of the cylinder is formed at least at a wall region forming a cylinder barrel by a coating of a crankcase or of a cylinder liner of the internal combustion engine by means of a coating material. According to the present disclosure, the coating material is formed by an, in particular high-alloy, steel alloy comprising, as alloying elements, at least chromium, nickel, copper and niobium.

As has surprisingly been found in tests, a cylinder barrel having such a coating or slide layer has a very good tribological behaviour (friction and wear properties) and also an outstanding corrosion resistance with respect to the corrosive condensates which form during fuel combustion. In the present application, this steel alloy coating also does not have a tendency to smear, as is often the case with other steel alloys. Furthermore, a surface formed by this coating material can also be machined or honed in a particularly simple manner and with little outlay, since this coating material does not comprise any abrasively acting ceramic particles. Moreover, the coating material according to the present disclosure is also cost-effective, since steel alloys comprising such alloying elements are commercially available.

In a preferred specific configuration, the steel alloy according to the present disclosure is formed by the steel 1.4542 (DIN EN 10088-3) or X5CrNiCuNb16-4 or by the steel 1.4548 (DIN EN 10088-3) or X5CrNiCuNb17-4-4. These are commercially available steels commonly used for air and space travel.

Furthermore, a vehicle, in particular a commercial vehicle, having the internal combustion engine according to the present disclosure is also claimed.

The advantages which arise by virtue of the vehicle according to the present disclosure are identical to the already acknowledged advantages of the internal combustion engine according to the present disclosure, and therefore these advantages are not repeated at this point.

Further aspects of the present disclosure are directed to a cylinder crankcase or to a cylinder liner having the coating according to the present disclosure.

To achieve the aforementioned object, a further aspect of the present disclosure is directed to a method for producing a crankcase or a cylinder liner for an internal combustion engine, wherein a coating material is applied by means of a coating device to a cylinder wall of the crankcase or the cylinder liner. According to the present disclosure, an, in particular high-alloy, steel alloy comprising, as alloying elements, at least chromium, nickel, copper and niobium is applied as the coating material to the cylinder wall.

The advantages which arise by virtue of the procedure according to the present disclosure are likewise identical to the already acknowledged advantages of the internal combustion engine according to the present disclosure, and are likewise not repeated at this point.

In a procedure according to the present disclosure, the coating material is applied by means of a thermal spraying method, wherein the coating device is formed by a heating and spraying device, in particular by a plasma burner, by means of which the coating material is heated and thereby melted, and the molten coating material is sprayed onto the cylinder wall of the crankcase or the cylinder liner. The coating material according to the present disclosure can thus be applied to the cylinder wall in a simple and effective manner in the required quality.

In one aspect of the present disclosure, the thermal spraying method is formed by atmospheric plasma spraying (APS), wherein the spray material or the coating material is conveyed in powder form by means of a feed device to a heating region of the heating and spraying device, in particular is injected into the plasma jet of a heating and spraying device in the form of a plasma burner. The coating material according to the present disclosure can thus be applied to the cylinder wall in a simple and effective manner.

Alternatively, the thermal spraying method can also be formed by wire arc spraying (WAS), wherein the spray material is conveyed in wire form by means of a feed device to a heating region of the heating and spraying device. In this way, the coating material according to the present disclosure can be applied to the cylinder wall in a particularly simple manner and with a particularly low outlay.

In a further aspect of the present disclosure, after the application of the coating material to the cylinder wall, a surface formed by the coating material is machined by means of a honing device having a honing tool, in particular a hone. By virtue of this post-machining by means of the honing device, the tribological properties of the slide layer of the crankcase or of the cylinder liner which is formed by the coating material according to the present disclosure are improved considerably, as a result of which wear to the cylinder barrel and a piston guided in the cylinder is effectively counteracted.

Still further the use of a high-alloy, steel alloy comprising, as alloying elements, at least chromium, nickel, copper and niobium as coating material for the coating of a cylinder barrel of a crankcase or a cylinder liner is contemplated by the present disclosure.

The advantages which arise by virtue of the use according to the present disclosure are likewise identical to the already acknowledged advantages of the internal combustion engine according to the present disclosure, and therefore these advantages are likewise not repeated at this point.

BRIEF DESCRIPTION OF THE FIGURES

The present disclosure and the advantageous embodiments or developments thereof and also the advantages thereof will be explained in more detail hereinbelow, merely by way of example, with reference to drawings, in which:

FIG. 1 shows a section through a crankcase of an internal combustion engine according to the present disclosure;

FIG. 2 shows a schematic illustration on the basis of which the procedure according to the present disclosure is explained; and FIG. 3 shows a section through a second embodiment of an internal combustion engine according to the present disclosure.

DETAILED DESCRIPTION

FIG. 1 shows a partial section through a crankcase 1 of an internal combustion engine according to the present disclosure. A cylinder wall 3 of the cylinder 5 shown in said figure is formed here entirely or continuously by a coating material 7 which forms a slide layer 6. As an alternative, it would also be conceivable, however, for the cylinder wall 3 to be coated by means of the coating material 7 only at a cylinder barrel portion 9 of the cylinder 5 or at a part of the cylinder barrel portion 9.

The coating material 7 is formed by a steel alloy comprising, as alloying elements, chromium, nickel, copper and niobium. This coating material 7 is particularly wear-resistant, corrosion-resistant and also simple to machine. Specifically, the steel alloy can be formed, for example, by the steel 1.4542 (DIN EN 10088-3) or by the steel 1.4548 (DIN EN 10088-3).

The slide layer 6 here is applied furthermore directly to a base material 10, formed for example by aluminum, of the crankcase 1. Alternatively, at least one supporting layer or stabilization layer could also be provided between the slide layer 6 and the base material 10 of the crankcase 1, by means of which supporting layer or stabilization layer fracturing of the slide layer 6 by possible plastic deformation of the base material 10 is counteracted.

A procedure according to the present disclosure for producing the crankcase 1 will be explained in more detail hereinbelow with reference to FIG. 2.

FIG. 2 schematically shows part of a coating device 11, by means of which a cylinder wall 13 of the crankcase 1 can be coated with the coating material 7. Here, the coating material 7 is applied to the uncoated cylinder wall 13 of the crankcase 1 by means of a thermal spraying method, here by way of example by atmospheric plasma spraying (APS).

Specifically, the coating material 7 is conveyed here in powder form via a feed line 15 of a plasma burner 17 of the coating device 11 to a heating region 19 of the plasma burner 17, or is injected into the plasma jet of the plasma burner 11. The coating material powder is heated by the high temperature of the plasma and thereby melted. The plasma jet or the plasma stream carries along the molten powder particles, and flings or sprays them onto the cylinder wall 13 of the crankcase 1 which is to be coated.

The plasma burner 17 here therefore forms a heating and spraying device by means of which the coating material 7 can be melted and sprayed, in the molten state, onto the cylinder wall 3 of the crankcase 1. As an alternative to atmospheric plasma spraying, the coating material 7 could also be applied to the cylinder wall 13, for example, by wire arc spraying (WAS).

After the application of the coating material 7 to the cylinder wall 13, a surface formed by the coating material is machined or honed by means of a honing device (not shown in the figures). In this way, the tribological properties of the slide layer 6 of the crankcase 1 which is formed by the coating material 7 are optimized.

FIG. 3 shows a partial section through a second embodiment of an internal combustion engine 21 according to the present disclosure. Here, it is not a crankcase 23 of the internal combustion engine 21 but rather a cylinder liner 27 of the internal combustion engine 21 inserted into a liner recess 25 of the crankcase 23 which forms a cylinder barrel of the internal combustion engine 21. The slide layer 6 composed of the coating material 7 here is therefore not applied to the crankcase 23, but rather to the cylinder liner 27 of the internal combustion engine 21.

LIST OF REFERENCE SIGNS

1 Crankcase
3 Cylinder wall
5 Cylinder
6 Slide layer
7 Coating material
9 Cylinder barrel
10 Base material
11 Coating device
13 Uncoated cylinder wall
15 Feed line
17 Plasma burner
19 Heating region
21 Internal combustion engine
23 Cylinder crankcase
25 Liner recess
27 Cylinder liner

The invention claimed is:

1. An internal combustion engine, comprising:
at least one cylinder, wherein a cylinder wall of the cylinder is formed at least at a wall region forming a cylinder barrel by a coating of a crankcase or of a cylinder liner of the internal combustion engine by a coating material, wherein the coating material is formed of a high-alloy, steel alloy including as alloying elements, chromium, nickel, copper and niobium, wherein the steel alloy is formed by the steel 1.4542

(DIN EN 10088-3) or by the steel 1.4548 (DIN EN 10088-3), and wherein the coating material is applied by means of atmospheric plasma spraying (APS), wherein the coating material is conveyed in powder form by means of a feed device to a heating region of a heating and spraying device and sprayed onto the crankcase or the cylinder liner, in particular the coating material is injected into a plasma jet of the heating and spraying device in the form of a plasma burner.

2. A vehicle, in particular a commercial vehicle, comprising an internal combustion engine, the internal combustion engine having at least one cylinder, wherein a cylinder wall of the cylinder is formed at least at a wall region forming a cylinder barrel by a coating of a crankcase or of a cylinder liner of the internal combustion engine by a coating material, wherein the coating material is formed of a high-alloy, steel alloy including as alloying elements, chromium, nickel, copper and niobium, wherein the steel alloy is formed by the steel 1.4542 (DIN EN 10088-3) or by the steel 1.4548 (DIN EN 10088-3) and wherein the coating material is applied by means of atmospheric plasma spraying (APS), wherein the coating material is conveyed in powder form by means of a feed device to a heating region of a heating and spraying device and sprayed onto the crankcase or the cylinder liner, in particular the coating material is injected into a plasma jet of the heating and spraying device in the form of a plasma burner.

3. A method for producing a crankcase or a cylinder liner for an internal combustion engine, comprising:

applying a coating material by means of atmospheric plasma spraying (APS) to a cylinder wall of the crankcase or the cylinder liner, wherein the coating material is conveyed in powder form by means of a feed device to a heating region of a heating and spraying device and sprayed onto the cylinder wall of the crankcase or the cylinder liner, in particular the coating material is injected into a plasma jet of the heating and spraying device in the form of a plasma burner, and wherein a high-alloy, steel alloy including, as alloying elements, chromium, nickel, copper and niobium is applied as the coating material to the cylinder wall, wherein the steel alloy is formed by the steel 1.4542 (DIN EN 10088-3) or by the steel 1.4548 (DIN EN 10088-3).

4. The method according to claim 3, wherein, after the application of the coating material, a surface formed by the coating material is machined by means of a honing device having a honing tool, in particular a hone.

5. A method of use comprising:

providing cylinder barrel of a crankcase or a cylinder liner; and applying by atmospheric plasma spraying (APS) a high-alloy, steel alloy comprising, as alloying elements, chromium, nickel, copper and niobium as coating material for the coating of the cylinder barrel of a crankcase or a cylinder liner, wherein the coating material is conveyed in powder form by means of a feed device to a heating region of a heating and spraying device and sprayed onto the cylinder barrel of the crankcase or the cylinder liner, in particular the coating material is injected into a plasma jet of the heating and spraying device in the form of a plasma burner, and wherein the steel alloy is formed by the steel 1.4542 (DIN EN 10088-3) or by the steel 1.4548 (DIN EN 10088-3).

* * * * *